United States Patent
Uchida et al.

[19]

[11] Patent Number: 5,823,816

[45] Date of Patent: *Oct. 20, 1998

[54] VEHICULAR LAMP HAVING IMPROVED CONNECTOR STRUCTURE

[75] Inventors: Kihachiro Uchida; Hironori Tsukamoto, both of Shizuoka, Japan

[73] Assignee: Koito Manufacturing Co., Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 474,728

[22] Filed: Jun. 7, 1995

[30] Foreign Application Priority Data

Jun. 14, 1994 [JP] Japan .................................. 6-131790

[51] Int. Cl.⁶ ...................................................... H01R 4/24
[52] U.S. Cl. ............................................. 439/419; 439/36
[58] Field of Search .................................... 439/395, 404, 439/398, 405, 56, 502, 505, 544, 558, 893, 417, 419, 541, 918, 414, 336, 356, 360, 375, 36, 888, 890, 699.2

[56] References Cited

U.S. PATENT DOCUMENTS

| | | | |
|---|---|---|---|
| Re. 34,135 | 12/1992 | Madsen et al. | 439/419 |
| 3,130,921 | 4/1964 | Morgan | 439/419 |
| 4,040,709 | 8/1977 | Dola et al. | 439/541 |
| 4,264,117 | 4/1981 | Pritulsky | 439/419 |
| 5,121,310 | 6/1992 | Ahroni | 439/419 |

FOREIGN PATENT DOCUMENTS

| | | |
|---|---|---|
| 3342382 | 10/1987 | Germany . |
| 3204275 | 5/1990 | Germany . |
| 4420673 | 1/1995 | Germany . |

*Primary Examiner*—Gary F. Paumen
*Assistant Examiner*—Tho D. Ta
*Attorney, Agent, or Firm*—Sughrue, Mion, Zinn, Macpeak & Seas, PLLC

[57] ABSTRACT

A vehicular lamp which can be manufactured without removing insulating covers from lamp-side cords to expose the core wires, and in which the lamp-side cords can be readily connected between terminals arranged in a socket or connector, the wiring and connecting of the cords is achieved in a short time, and can be automated. A connector and sockets are detachably mounted on a rear cover. The connector includes a connector casing, and a plurality of terminals. Each of the terminals has a cord connecting groove, the edge of which serves as an insulating cover cutting edge. When the connector casing is engaged with a mounting section and secured with elastic engaging pieces, the terminals are caused to push the cords so that the cords are pushed into the cord connecting grooves of the terminals. In this operation, the insulating covers of the cords are cut by the insulating-cover cutting edge, so that the core wires of the cords are electrically connected to the terminals.

29 Claims, 7 Drawing Sheets

VEHICULAR LAMP HAVING IMPROVED CONNECTOR STRUCTURE

BACKGROUND OF THE INVENTION

The present invention relates to a vehicular lamp in which a rear cover is arranged on the rear portion of a lamp body, and a plurality of light bulbs and lamp-side cords are arranged on the inner surface of the lamp body.

There are known basically two types of bulb mounting structures for various vehicular lamps such as a tail lamp, turn signal lamp, stop lamp, clearance lamp, or side marker lamp. In a first type of first bulb mounting structure, a light bulb is inserted into a lamp body through a bulb insertion hole formed in the rear wall of the latter, and set therein through a socket. In a second type of bulb mounting structure, a rear cover is fitted in an opening formed in the rear wall of the lamp body, and a light bulb and socket are mounted on the inner surface of the rear cover.

The invention relates to a vehicular lamp having the second bulb mounting structure, and to an improvement of a structure connecting lamp-side cords to a socket or connector.

FIG. 12 is a sectional view outlining the arrangement of a conventional vehicular lamp having a rear cover. In FIG. 12, reference numeral 1 designates a vehicle body panel, and 2, a vehicular lamp which is mounted through a gasket 3 on the front surface of the vehicle body panel 1 by suitable means (not shown) such as fixing screws or fasteners. The lamp 2 includes a lamp body 5 in which a reflector 4 is provided, a front lens 6 which hermetically covers the front opening 5A of the lamp body 5, a rear cover 7 which is fitted in an opening 5B formed in the rear wall of the lamp body 5, two light bulbs 9 (or 9A and 9B) mounted through sockets 8 (or 8A and 8B) on the inner surface of the rear cover 7, and a connector 10 formed on the rear surface of the rear cover 7 (hereinafter referred to as "a lamp-side connector 10", when applicable).

The lamp-side connector 10 is connected through lamp-side cords 11 to the sockets 8A and 8B. The connector 10 is inserted into an insertion hole 12 formed in the vehicle body panel 1 and thrust in the direction indicated by an arrow until it is connected to a connector 13 on the side of the vehicle body (hereinafter referred to as "a vehicle-body-side connector 13", when applicable). First ends of the cords 11 are connected to terminals arranged in the sockets 8A and 8B, and the remaining second ends are connected to the terminals arranged in the lamp-side connector 10.

The above-described conventional vehicular lamp is disadvantageous in the following points:

As described above, the first ends of the lamp-side cords 11 are connected to the terminals of the sockets 8A and 8B, and the remaining second ends are connected to the terminals of the lamp-side connector 10. In order to connect the cords 11 in this way, first it is necessary to remove the insulation from the end portions of the cords 11 to expose the core wires. This operation is rather troublesome. Moreover, although it is possible to automate the mounting of the lamp 2 on the vehicle body panel 1, it is impossible to automate the wiring and connecting of the lamp-side cords 11.

SUMMARY OF THE INVENTION

In view of the foregoing, an object of the invention is to provide a vehicular lamp which can be manufactured without requiring a step of removing the insulation from the end portions of the lamp-side cords to expose the core wires, in which the lamp-side cords can be readily connected to the terminals arranged in the socket or connector, and the wiring and connecting operations for the cords can be achieved in a short time and are effected in such a manner that they can be automated.

The foregoing and other objects of the invention have been achieved by the provision of a vehicular lamp in which a rear cover is arranged in an opening formed in the rear wall of a lamp body, and a plurality of light bulbs and lamp-side cords are arranged on the inner surface of the rear cover, in which, according to one aspect of the invention, terminals are arranged at a socket region or a connector region of the rear cover each having a cord connecting end portion with a cord connecting groove in which an end portion of a lamp-side cord is inserted, the edge of the cord connecting groove serving as an edge for cutting the insulating cover of the lamp-side cord.

Yet further, the objects of the invention are met by a vehicular lamp in which a rear cover is arranged in an opening formed in the rear wall of a lamp body, and a plurality of light bulbs and lamp-side cords are arranged on the inner surface of the rear cover, in which, according to another aspect of the invention, the rear cover has a mounting section with which a connector or socket is detachably engaged, and terminals are arranged in the connector or socket, the terminals each having a cord connecting end portion with a cord connecting groove in which an end portion of a lamp-side cord is inserted, the edge of the cord connecting groove serving as an edge for cutting the insulating cover of the lamp-side cord, and the connector or socket is fixedly engaged with the mounting section in such a manner that the lamp-side cords are pushed in the cord connecting grooves of the terminals, thus being electrically connected to the terminals.

In the above-described vehicular lamps, cord accommodating grooves may be formed in the inner surface of the rear cover to accommodate the lamp-side cords.

With the vehicular lamp of the invention, each cord is pushed into the cord connecting groove of the respective terminal. In this operation, the insulating cover of the cord is cut by the edge of the cord connecting groove, namely, the insulating-cover cutting edge, so that the core wire of the cord is electrically connected to the terminal.

When the connector or socket is fixedly engaged with the mounting section of the rear cover, the lamp-side cords are pushed into the cord connecting grooves of the respective terminals. In this operation, the insulating cover of the lamp-side cords are cut by the insulating-cover cutting edges, so that the core wires of the cords are electrically connected to the terminals.

The cord accommodating grooves are adapted to position the cords in place.

DESCRIPTION OF THE PREFERRED EMBODIMENTS

The invention will be described with reference to preferred embodiments shown in the accompanying drawings.

Figure 1:
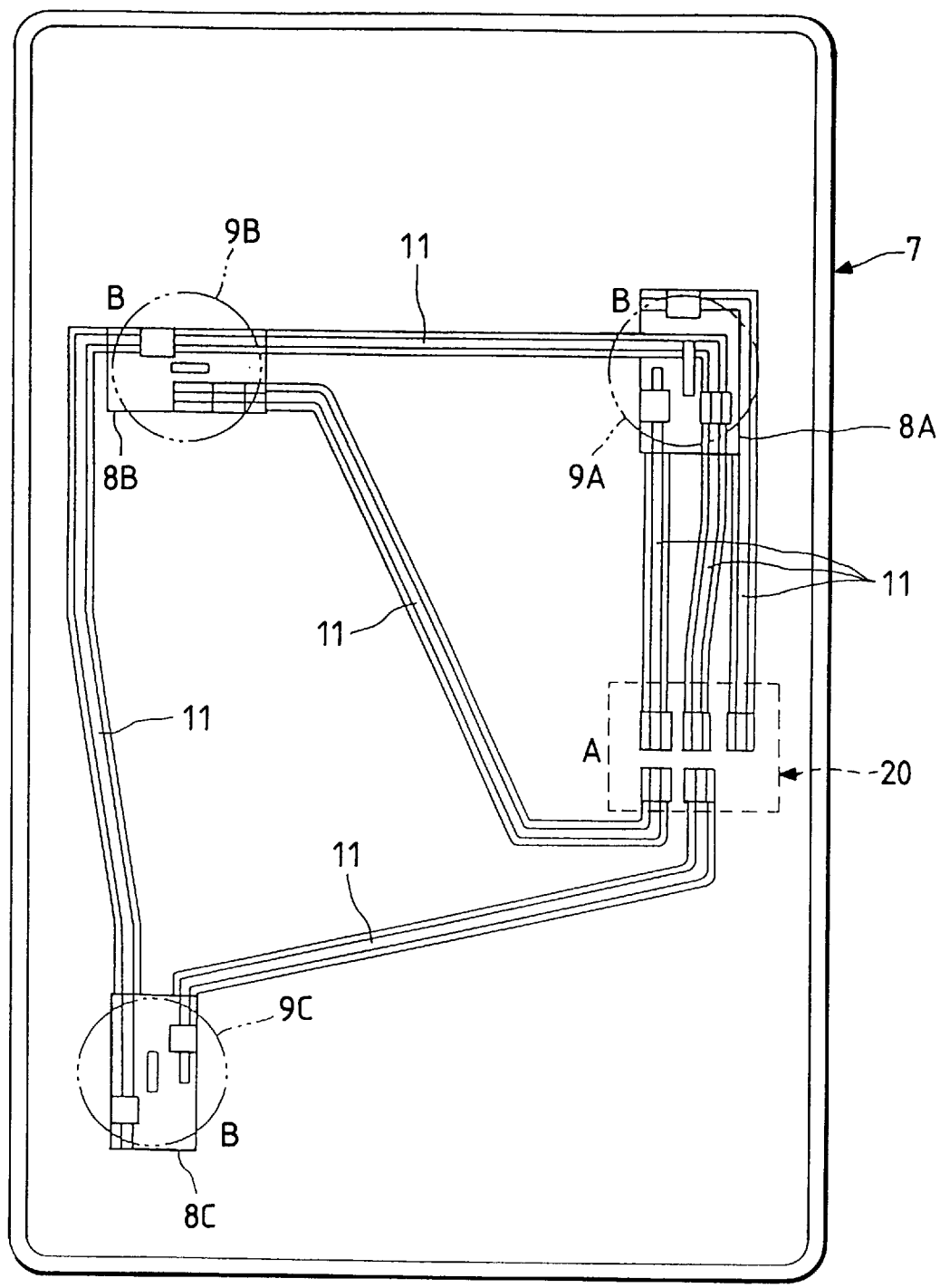
FIG. 1 is a front view showing a rear cover in an example of a vehicular lamp constructed in accordance with a first embodiment of the invention.
Figure 12:
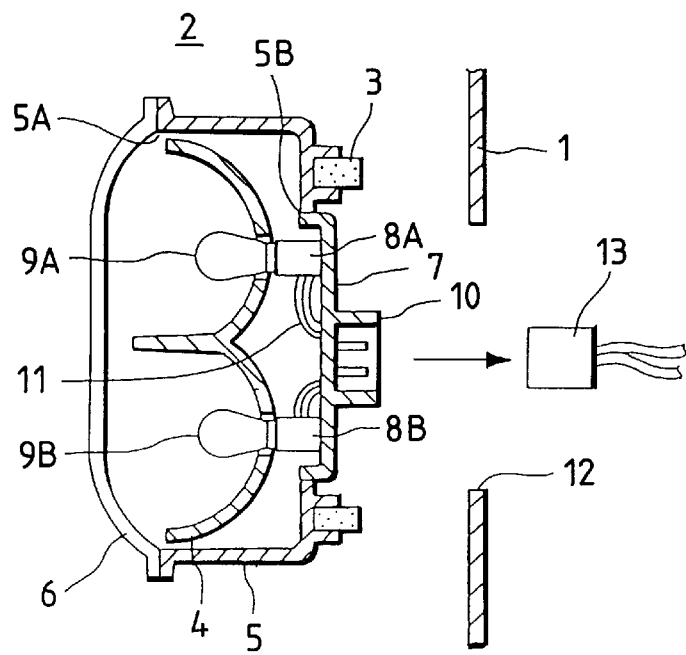
FIG. 12 is a sectional view showing a conventional vehicular lamp with a rear cover.

FIG. 1 is a front view of a rear cover in an example of a vehicular lamp constructed in accordance with a first embodiment of the invention. In this embodiment, as shown in FIG. 1, three light bulbs 9 (9A, 9B and 9C) are mounted through sockets 8 (8A, 8B and 8C) on the inner surface of the rear cover 7, which is detachably fitted in an opening formed in the rear wall of a lamp body 5 (FIG. 12). The sockets 8 are connected through cords 11 to a lamp-side connector 20, which is connected to a vehicle-body-side connector 13 (FIG. 12).

The structures of the lamp-side connector and the sockets now will be described in detail.

Figure 2:
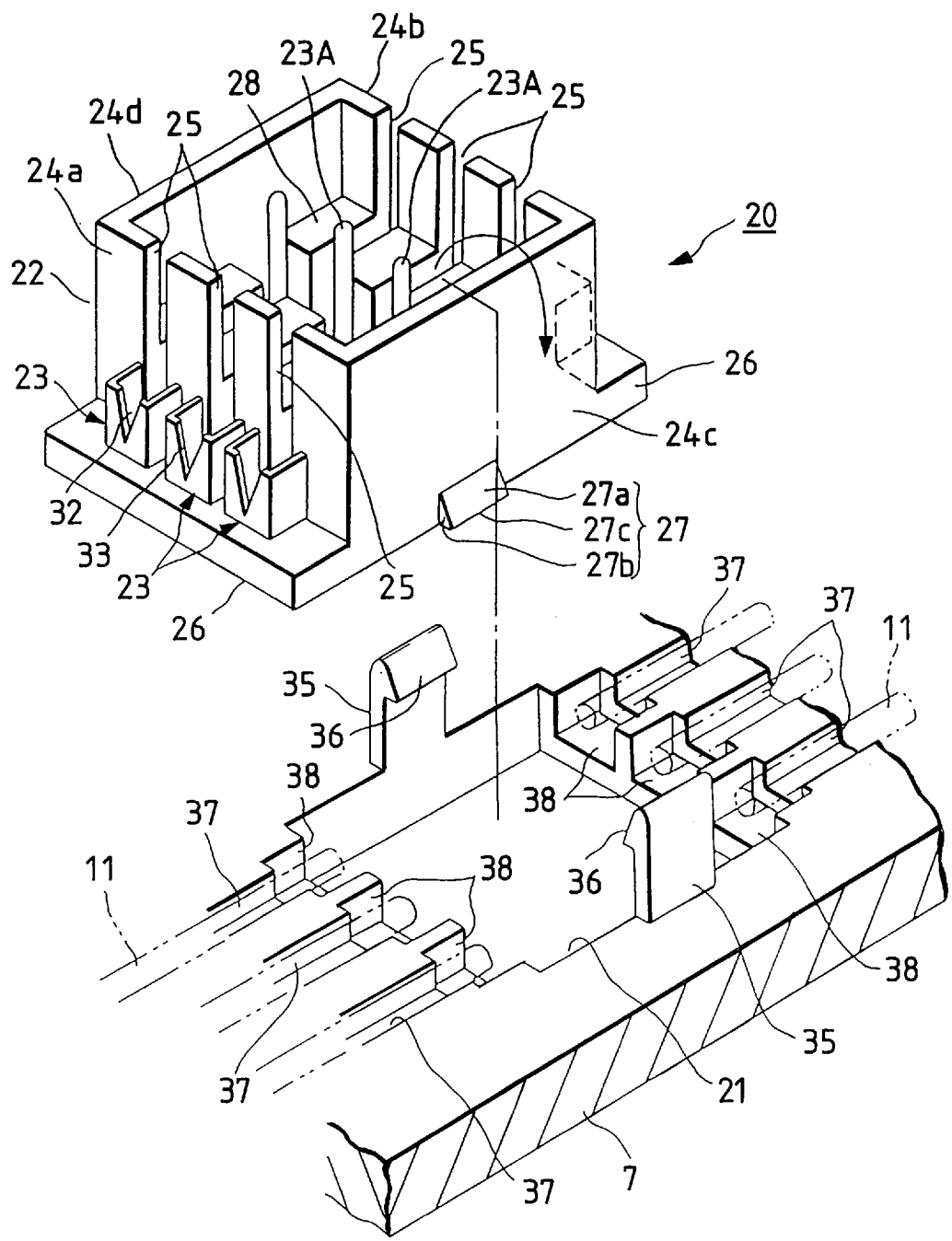
FIG. 2 is a perspective view showing the arrangement of an example of a lamp-side connector in the vehicular lamp of FIG. 1.
Figure 3:
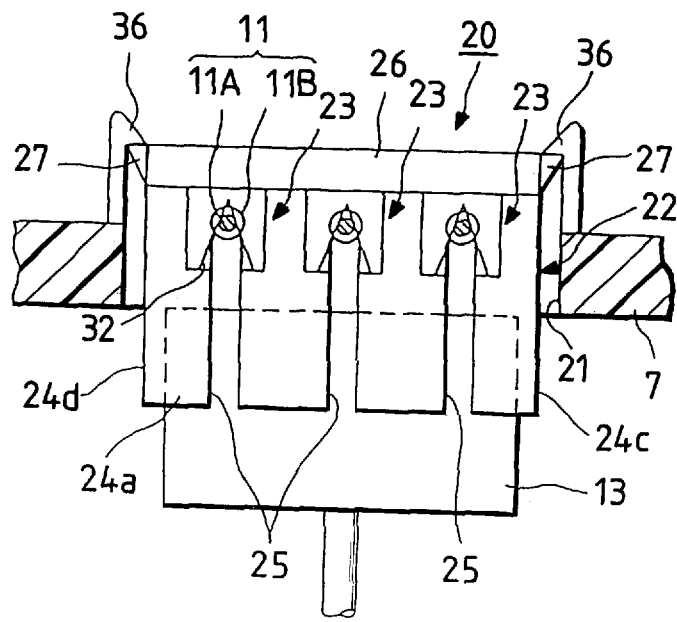
FIG. 3 is a sectional view of the lamp-side connector mounted on the rear cover.
Figure 4:
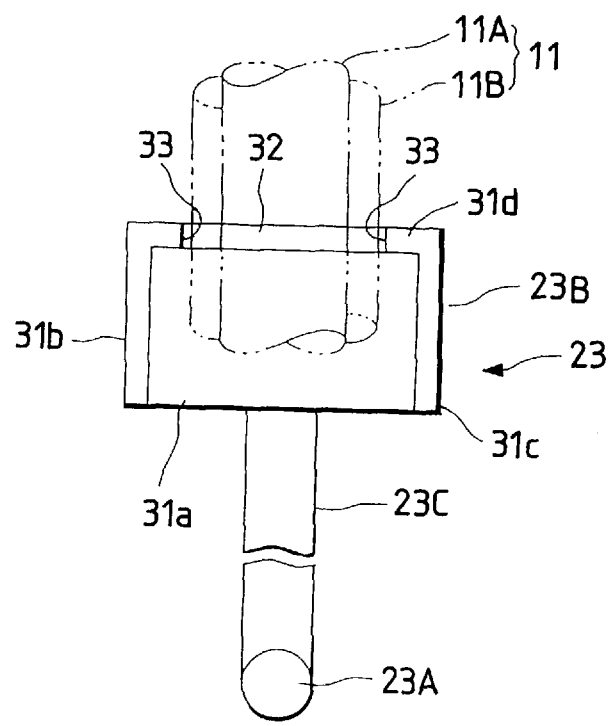
FIG. 4 is a plan view showing an example of a terminal in the vehicular lamp of the invention.

FIG. 2 is a perspective view of the lamp-side connector. FIG. 3 is a sectional view of the lamp-side connector mounted on the rear cover. FIG. 4 is a plan view of a terminal.

As is apparent from those figures, the rear cover 7 has a connector mounting section 21 inclusive of a rectangular hole formed in the rear cover 7. The lamp-side connector 20 is detachably fitted in the connector mounting section 21 from the front side of the rear cover 7 in such a manner that a portion of the connector 20 protrudes outside the rear cover 7 so that it is connected to the vehicle-body-side connector 13. The lamp-side connector 20 includes a connector casing 22 made of resin formed by injection-molding and a predetermined number of positive and negative terminals 23 (for instance, five terminals) arranged in the connector casing 22. The connector casing 22 is in the form of a rectangular box, having a bottom wall, a pair of side walls 24a and 24b which are parallel to one another, and another pair of side walls 24c and 24d which are also parallel to one another.

Three parallel grooves 25 are cut in each of the side walls 24a and 24b of the connector casing 22 at predetermined intervals, extending to the edge of the opening of the box-shaped connector casing 22. A pair of terminal mounting boards 26 extend outward from respective parallel edges of the bottom wall of the connector casing 22 from which the side walls 24a and 24b extend. A pair of engaging ears 27 are formed along the middle parts of the remaining two parallel edges of the bottom wall of the connector casing 22 from which the side walls 24c and 24d extend. Each of the engaging ears 27 is in the form of a prismatic triangle, having a surface 27a sloped with respect to the respective side wall (24c or 24d), a pair of surfaces 27b at the ends of the sloped surface 27a, and a rear surface 27c which is flush with or integral with the outer surface of the bottom wall of the connector casing 22.

Six protrusions 28 extend along the inner surfaces of the side walls 24a and 24b from the inner surface of the bottom wall of the connector casing 22. More specifically, three of the protrusions 28 extend along the inner surface of the side wall 24a, thus being located on one side of the vehicle-body-side connecting end portions 23A of the terminals 23, while the remaining three extend along the inner surface of the side wall 24b, thus being located on the other side of the vehicle-body-side connecting end portions 23A. The front end faces of the protrusions 28 are located deeper in the connector casing than the ends of the vehicle-body-side connecting end portions 23A of the terminals 23, and are flush with one another, thus defining the insertion length of the vehicle-body-side connector 13.

Each of the terminals 23, as shown in FIG. 4, includes the aforementioned vehicle-body-side connecting end portion 23A, a lamp-side connecting end portion, namely, a cord connecting end portion 23B, and a coupling portion 23C through which the vehicle-body-side connecting end portion 23A is coupled to the cord connecting end portion 23B. The vehicle-body-side connecting end portion 23A is in the form of a pin circular in section, or in the form of an elongated plate. The cord connecting end portion 23B is formed, for instance, by bending a metal plate. That is, the cord connecting end portion 23B has a bottom wall 31a, and two side walls 31b and 31c, and one end wall 34c which include three edges of the bottom wall 31a, respectively. In other words, the cord connecting end portion 23B has no top wall opposite the bottom wall, and opens towards the vehicle-body-side connecting end portion 23A.

A V-shaped cord-connecting groove 32 is formed in the middle of the side wall 31d which is directly confronted with the vehicle-body-side connecting end portion 23A. More specifically, the groove 32 extends from the outer edge of the side wall 31d towards the bottom wall 31a. The edge of the cord connecting groove 32 serves as an edge 33 for cutting the insulating cover of the cord (hereinafter referred to as "an insulating-cover cutting edge 33", when applicable). The insulating-cover cutting edge 33 can be readily formed simultaneously when the terminal 23 is formed by punching a thin metal plate. The coupling portion 23C is in the form of an elongated plate. One end of the coupling portion 23C is connected to the base end face of the vehicle-body-side connecting end portion 23A, and the other end is connected to the bottom wall 31a. The coupling portion 23C is inserted in the groove 25 of the connector casing 22. As a result, the vehicle-body-side connecting end portion 23A is positioned inside the casing at the middle, while the cord connecting end portion 23B is mounted on the terminal mounting board 26. With the terminal 23 set in the above-described manner, the end of the vehicle-body-side connecting end portion 23A is located near the plane of the opening of the connector casing 22.

Each of the terminals 23 is fixedly secured to the connector casing 22 with suitable means (not shown) such as a locking piece or screw, or it is made integral with the connector casing 22 during molding.

As shown in FIG. 2, in order to elastically lock the connector casing 22, a pair of elastic engaging pieces 35 are formed on both sides of the aforementioned connector mounting section in the inner surface of the rear cover 7. Each of the elastic engaging pieces 35 is elastically deformable in the direction of its thickness. The elastic engaging pieces 35 have locking pawls 36 and 36 on the inner surfaces of their respective outer end portions which are engaged with the above-described engaging ears 27 of the connector casing 22. Furthermore, in the inner surface of the rear cover 7, cord accommodating grooves 37 are formed between the connector region A and the socket regions B (FIG. 1). Each of the cord accommodating grooves 37 is substantially equal in outside diameter to the lamp-side cord 11, or slightly larger.

The mounting of the connector 20 and the connection of the lamp-side cords 11 and the terminals 23 now will be described.

Each lamp-side cord 11 is fitted in the respective cord accommodating groove 37 with one end portion set in a recess 38. In this case, the cord 11 is fitted in the groove 37 as it is, that is, the insulating cover 11B of the cord 11 is not removed to expose the core wire 11A (FIG. 3). After the cords have been fitted in the grooves 37 in the above-described manner, the connector casing 22 is fitted in the connector mounting section 21 of the rear cover 7 beginning with its open end portion, while the elastic engaging pieces 35 are being engaged with the engaging ears 21. Thus, the connector casing 22 is fixedly set in the connector mounting section 21. In this operation, the cord connecting end portion 23B of each terminal 23 is fitted in the respective recess 38 while being pushed against the end of the lamp-side cord 11, so that the insulating cover 11B of the cord 11 is cut by the edge of the cord connecting groove 32, namely, the insulating-cover cutting edge 33 (FIG. 4); that is, the core wire 11A is electrically connected to the terminal 23 upon being brought into contact with the latter. Since the end portion of the cord 11 is pushed by the insulating-cover cutting edge 33, the cord 11 is prevented from coming off the terminal 23. As is apparent from the above description, the mounting of the connector 20 on the rear cover 7 and the wiring and connection of the cords 11 are achieved at the same time.

Figure 5:
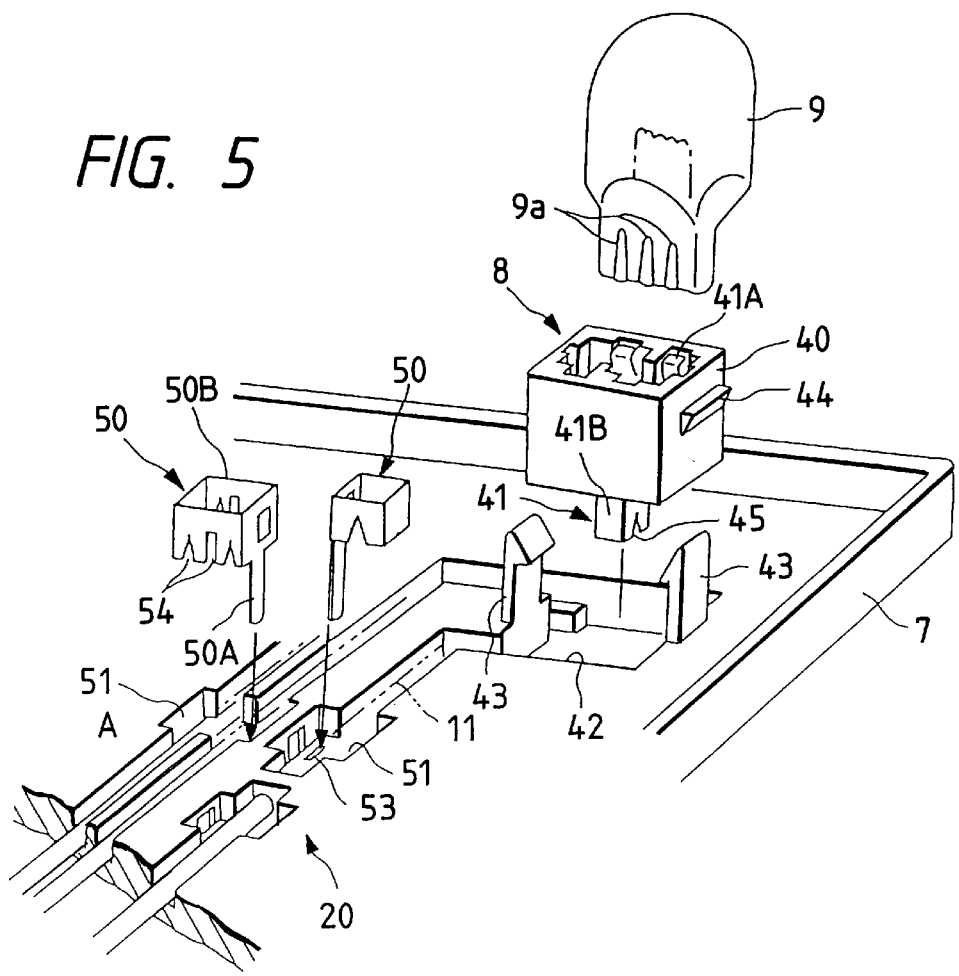
FIG. 5 is a perspective view showing the mounting structure of an example of a socket in the vehicular lamp of the invention.
Figure 6:
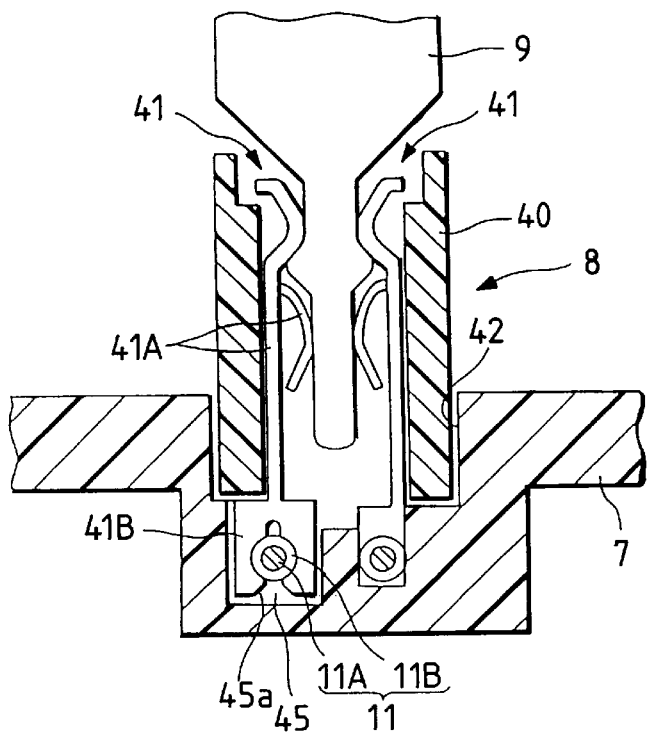
FIG. 6 is a sectional view for a description of the mounting structure of the socket shown in FIG. 5.
Figure 7:
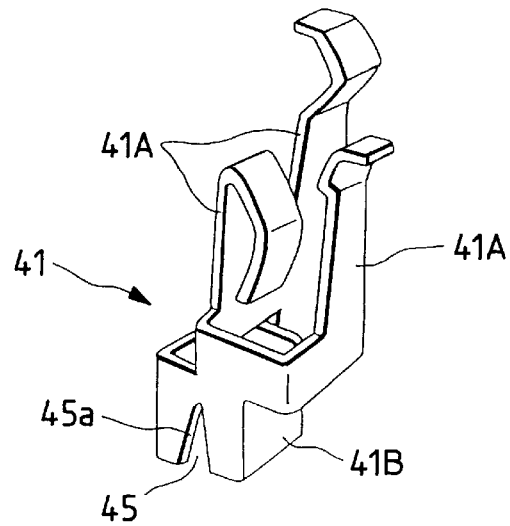
FIG. 7 is a perspective view showing another example of the terminal.

FIG. 5 is a perspective view showing the mounting structure of the socket, and FIG. 6 is a sectional view of the socket. FIG. 7 is a perspective view of the terminal.

As is apparent from those figures, the socket 8 through which the light bulb 9 is connected to the cord 11 is similar in structure to the above-described connector 20. The socket 8 includes a socket casing 40 in which the light bulb 9 is inserted, and a pair of positive and negative terminals 41 set inside the socket casing 40 in such a manner that they are partially exposed. The socket 8 is fitted in a socket mounting section 42, which is in the form of a recess formed in the inner surface of the rear cover 7. More specifically, the socket 8 is detachably set in the socket mounting section 42 with the aid of a pair of engaging ears 44 formed on the socket and a pair of elastic engaging pieces 43 provided at the socket mounting section 42.

The terminal 41, as shown in FIG. 7, includes bulb connecting end portions 41A, which are three elastic plates, and a cord connecting end portion 41B. The bulb connecting end portions 41A are brought into contact with respective ones of the three terminals 9a of the bulb 9. The cord connecting end portion 41B is in the form of a box protruding behind the socket casing 40. Similarly as in the case of the above-described cord connecting end portion 23B, a V-shaped cord connecting groove 45 is formed in one side wall of the box-shaped cord connecting end portion 41B in such a manner that it opens towards the inner surface of the bottom wall of the socket mounting section 41, thus serving as an insulating-cover cutting edge 45a.

When the socket 8 is fitted in the socket mounting section 42 and fixed with the pair of elastic engaging pieces 43, the cord connecting end portion 41B is pushed against the bottom wall of the socket mounting section 42. As a result, the end portion of the cord 11 is pushed in the cord connecting groove 45, and the insulating cover 11B of the cord 11 is cut by the insulating-cover cutting edge 45a, so that the core wire 11A of the cord 11 is brought into contact with the terminal 41 and electrically connected thereto. In this case, since the end portion of the cord 11 is held pushed by the insulating-cover cutting edge 45a, the cord 11 is prevented from being disconnected from the terminal 41.

As is apparent from the above description, similarly as in the case of the above-described connector 20, the socket 8 is also detachably fitted in the rear cover 7 in one action, and is electrically connected to the cords 11 at the same time. The light bulb 9 can readily connected to the socket 8 thus mounted.

Figure 8:
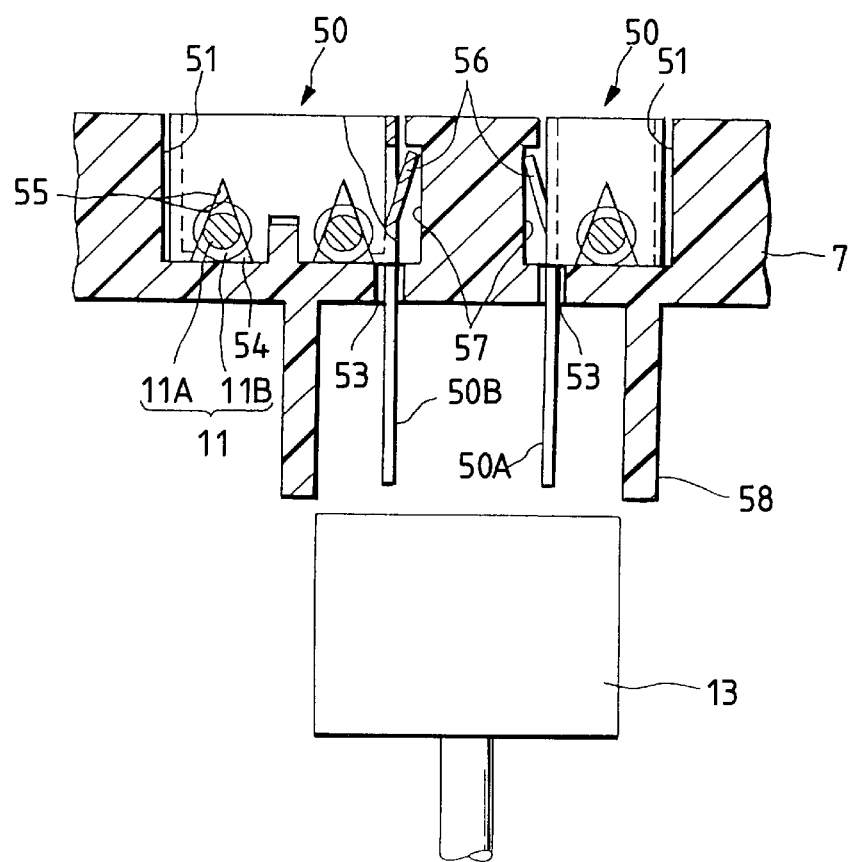
FIG. 8 is a sectional view showing another example of the mounting structure of the terminal.

In FIGS. 5 and 8, reference numeral 50 designates another example of a terminal which is set at the connector region A.

The terminal 50 is directly inserted in a terminal mounting section 51, which includes a recess formed in the inner surface of the rear cover 7, and fixed thereto. The terminal 50 includes a vehicle-body-side connecting end portion 50A, which is in the form of an elongated plate, and a box-shaped cord connecting end portion 50B, which is integral with the vehicle-body-side connecting end portion 50A. The connecting end portion 50A protrudes outside the rear cover 7 through a slit 53 formed in the bottom of the terminal mounting section 51, and is connected to the vehicle-body-side connector 13. A cord connecting groove 54 is formed in one side wall of the box-shaped cord connecting end portion 50B, serving as an insulating-cover cutting edge 55. A tongue-shaped piece 56 for preventing the terminal from being disconnected from the terminal mounting section is formed in another side wall of the box-shaped cord connecting end portion 50B by cutting. The tongue-shaped piece 56 is engaged with a recess 57 formed in the respective one of the walls of the terminal mounting section 51 to prevent the terminal from being disconnected from the terminal mounting section 51. As is apparent from the above description, the terminal 50 is substantially similar in structure to the terminal 41 in the socket 8.

FIG. 8 shows two types of terminals 50. One of the terminals 50 has a single cord connecting groove 54, and the other has two cord connecting grooves. In FIG. 8, reference numeral 58 designates a connector engaging wall with which the vehicle-body-side connector 13 is engaged.

With the vehicular lamp thus constructed, in connecting the lamp-side cords 11 to the connector 20 or the sockets 8 or the terminals 23, 41 or 50, the edges of the grooves of the terminals 23, 41 or 50, namely, the insulating-cover cutting edges 33, 45a or 55, cut the insulating covers 11B of the cords 11 so that the core wires of the cords 11 are electrically connected to the terminals. Hence, it is unnecessary to manually strip the insulating covers 11B of the cords 11 in advance, that is, the cords 11 can be arranged on the inner surface of the rear cover 7 as they are. Hence, the wiring and connection of the cords 11 can be achieved with ease, and can be automated. Furthermore, the connector 20, the sockets 8, and the terminals 50 can be mounted on the rear cover 7 in one action, so that the mounting of these components can be achieved readily.

Figure 9:
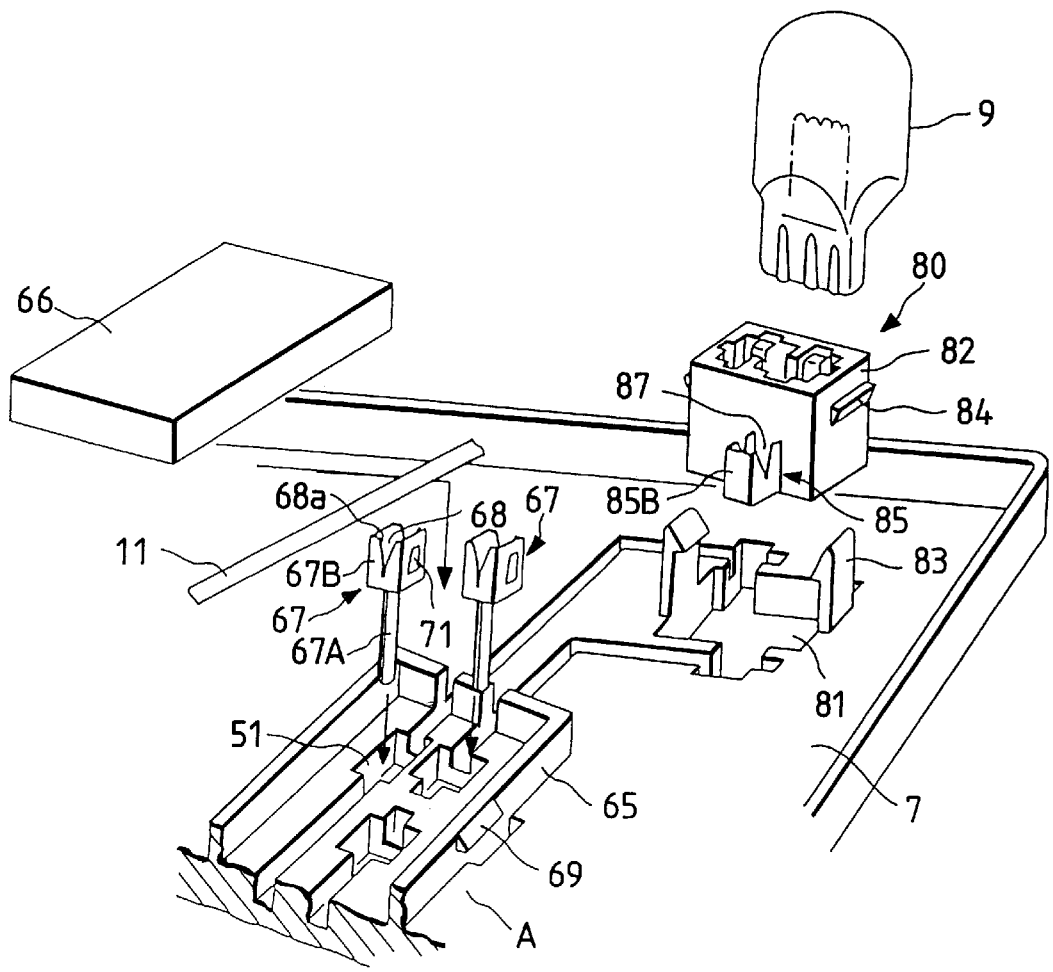
FIG. 9 is a perspective view showing a rear cover in another example of the vehicular lamp, which constitutes a second embodiment of the invention.

FIG. 9 is a perspective view showing essential parts of another example of the rear cover for a description of a second embodiment of the invention.

In the second embodiment, as shown in FIG. 9, an engaging wall 65 extends from the inner surface of the rear cover 7 in such a manner that it surrounds the connector region A, and a connector cap 66 is used to fit the cords 11 in cord connecting grooves 68 formed in terminals 67. Engaging ears 69 are formed on the outer surface of the engaging wall 65 to lock the connector cap 66. Similarly as in the case of the terminal 50 shown in FIG. 8, the terminals 67 are directly inserted in terminal mounting sections 51, which are each in the form of a recess. Each of the terminals 67 includes a vehicle-body-side connecting end portion 67A in the form of an elongated plate, and a box-shaped cord connecting end portion 67B. The vehicle-body-side connecting end portion 67A of the terminal 67 is inserted into a slit 53 (FIG. 8) formed in the bottom of the terminal mounting section 51 in such a manner that it protrudes outside the rear cover 7. The vehicle-body-side connecting end portion 67A is thus connected to the vehicle-side connector 13 (FIG. 8). The box-shaped cord connecting end portion 67B has a cord connecting groove 68 formed in one side wall thereof, which serves as an insulating-cover cutting edge 68a. The cord connecting groove 68 opens towards the connector cap 66. In addition, an elongated piece 56 for preventing the terminal from coming off the terminal mounting section is formed in another side wall of the box-shaped cord connecting end portion 50B by cutting. The piece 56 is engaged with a recess 57 formed in the respective one of the walls of the terminal mounting section 51 to prevent the terminal 67 from coming off the latter.

When the connector cap 66 is fixedly put on the engaging wall 65, the inner surface of the connector cap 66 pushes the cords 11 so that the cords 11 are fitted in the cord connecting grooves 68 of the terminals 67. As a result, the insulating covers of the cords 11 are cut by the insulating-cover cutting edges 68a so that the core wires of the cords 11 are electrically connected to the cord connecting end portions 67B of the terminals 67.

Figure 10:
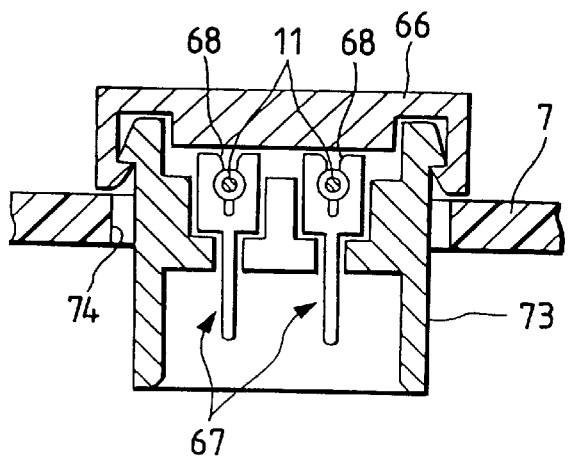
FIG. 10 is a sectional view showing another example of the connector.

In the second embodiment shown in FIG. 9, the terminals 67 are directly fitted in the terminal mounting sections 51 in the connector region A. However, they may be arranged in a connector casing 73 as shown in FIG. 10. In this case, the connector casing 73 is fitted in a connector mounting section 74, which includes a through-hole formed in the rear cover 7, and under this condition the connector cap 66 is detachably engaged with the connector casing 73 so as to push the cords 11 thereby to fit the latter in the cord connecting grooves 68.

Figure 11:
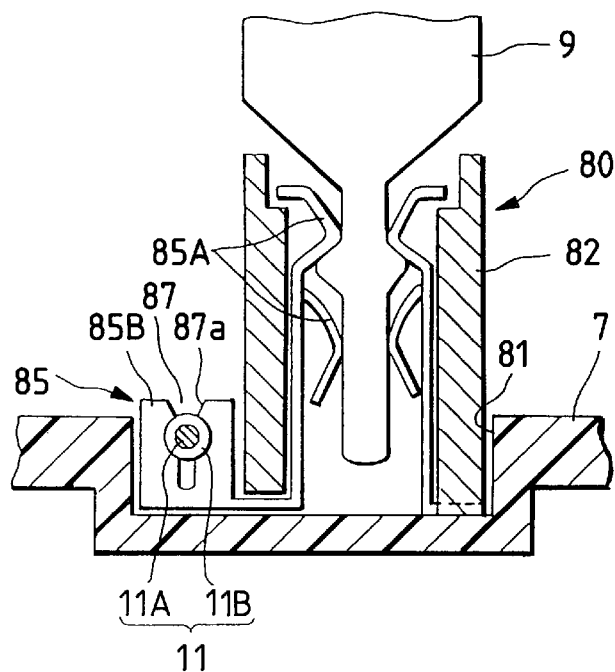
FIG. 11 is a sectional view showing another example of the socket.

In FIGS. 9 and 11, reference numeral 80 designates a socket. The socket 80 includes a plurality of terminals 85a and a socket casing 82 detachably fitted in a socket mounting section 81, which includes a recess formed in the inner surface of the rear cover, with the aid of a pair of engaging ears 84 and a pair of elastic engaging pieces 83. Each of the terminals 85 has a plurality of bulb connecting end portions 85A and a cord connecting end portion 85B integral with the former 85A. The bulb connecting end portions 85A are inserted in the socket casing 82, and the cord connecting end portion 85B, extending outside the socket casing 82, is laid in the terminal mounting section 81. The cord connecting end portion 87 has a cord connecting groove 87 which opens towards the bulb 9, thus serving as an insulating-cover cutting edge 87a. When the cord 11 is pushed in the cord connecting groove 87, its insulating cover 11B is cut by the insulating-cover cutting edge 87a, so that the core wire 11A is electrically connected to the terminal 85.

As in the cases of the above-described embodiment, it is unnecessary to manually strip the insulating covers 11B of the cords 11 in advance, that is, the cords 11 can be arranged on the inner surface of the rear cover 7 merely by inserting them into the cord connecting grooves 67 as they are. Hence, the wiring and connection of the cords 11 can be achieved with ease, and can be automated.

In the above-described embodiments, the cord connecting grooves of the terminals are V-shaped or Y-shaped; however, the invention is not limited thereto or thereby. For instance, the grooves may be U-shaped. In this case, the width of the grooves should be substantially equal to or slightly smaller than the diameter of the core wire.

As described above, in the vehicular lamp according to the invention, the terminals arranged in the socket or connector region of the rear cover each have a cord connecting end portion with a cord connecting groove in which the end portion of a lamp-side cord is inserted, and the edge of the groove serves as an edge for cutting the insulating cover of the lamp-side cord. Hence, when the cord is inserted into the cord connecting groove of the terminal, the insulating cover of the cord is automatically cut by the edge of the cord connecting groove of the terminal so that the core wire of the cord is electrically connected to the terminal. Thus, with the vehicular lamp of the invention, it is unnecessary to manually strip the insulating cover of the cord to expose the core wire. Therefore, the connecting of the cords to the terminals can be readily achieved, and the wiring of the cords can be automated.

Furthermore, in the vehicular lamp of the invention, the rear cover has a mounting section with which the connector or socket is detachably engaged, and the terminals are arranged in the connector or socket. Each of the terminals has the cord connecting end portion with the cord connecting groove in which an end portion of a lamp-side cord is inserted, the edge of the cord connecting groove serving the edge for cutting the insulating cover of the lamp-side cord. When the connector or socket is fixedly engaged with the mounting section, the lamp-side cords are pushed in the cord connecting grooves of the terminals, thus being electrically connected to the terminals. That is, the mounting of the connector or socket, and the connecting of the cords to the terminals are achieved at the same time. This means that the vehicular lamp of the invention can be formed with a high work efficiency.

In addition, because the rear cover has the cord accommodating grooves, the wiring of the cords can be readily achieved, and the cords can be correctly positioned.

What is claimed is:

1. A vehicular lamp comprising:
   a lamp body;
   a rear cover arranged in an opening formed in a rear wall of said lamp body;
   a plurality of light bulb sockets, a plurality of light bulbs fitted in respective ones of said sockets, and a plurality of cords arranged on an inner surface of said rear cover and connected to respective ones of said light bulbs through said sockets; and
   a first connector comprising a plurality of terminals arranged in a connector region of said rear cover, said first connector being disposed on an outer surface of said rear cover, each of said terminals having a cord connecting end portion with a cord connecting groove in which an end portion of a respective one of said cords is inserted, each of said cord connecting grooves having an edge for cutting an insulating cover of said cord and making electrical contact to a core wire of said cord;
   wherein said plurality of cords connect said first connector to said sockets such that said plurality of light bulbs are electrically connected to said plurality of terminals, and said first connector is connected to a second connector to supply electricity to each of said light bulbs via said plurality of terminals; and wherein said second connector is disposed within a vehicle body, and said first connector is inserted into said vehicle body to connect to said second connector.

2. The vehicular lamp of claim 1, wherein said first connector is detachably fitted in a conforming hole in said rear cover.

3. The vehicular lamp of claim 2, wherein at least a portion of said first connector protrudes outside said rear cover for making connection to a second connector.

4. The vehicular lamp of claim 2, further comprising a pair of elastic engaging pieces formed on both sides of said lamp-side connector in an inner surface of said rear cover, each of said elastic engaging pieces being elastically deformable in the direction of its thickness.

5. The vehicular lamp of claim 2, wherein said lamp-side connector comprises a connector casing made of resin formed by injection molding, said terminals being arranged in said connector casing.

6. The vehicular lamp of claim 5, wherein said connector casing is in the form of a rectangular box having a bottom wall, a pair of first side walls parallel to one another, and a second pair of side walls parallel to one another, a plurality of parallel grooves being formed in at least one of said side walls extending to an edge of said box-shaped connector casing, a pair of terminal mounting boards extending outward from respective two parallel edges of said bottom wall from which said first pair of side walls extend.

7. The vehicular lamp of claim 2, wherein each of said terminals comprises a second connecting end portion, a cord connecting end portion, and a coupling portion through which said second connecting end portion is coupled to said cord connecting end portion.

8. The vehicular lamp of claim 7, wherein said second connecting end portion is in the form of a pin circular in section.

9. The vehicular lamp of claim 7, wherein said second connecting end portion is in the form of an elongated plate.

10. The vehicular lamp of claim 7, wherein said cord connecting end portion is formed from a metal plate bent to provide a bottom wall, two side walls, and one end wall with an opening directed towards said second connecting end portion.

11. The vehicular lamp of claim 10, wherein said cord-connecting groove comprises a V-shaped cord-connecting groove formed in the middle of a one of said side walls directly confronting said second connecting end portion, said groove extending from an outer edge of said one of said side walls towards said bottom wall, one edge of said cord connecting groove serving as said edge for cutting an insulating cover of said cord and making electrical contact to a core wire of said cord.

12. The vehicular lamp of claim 2, wherein cord accommodating grooves are formed in the inner surface of said rear cover between said first connector and said sockets, each of said cord accommodating grooves receiving a respective one of said cords.

13. The vehicular lamp of claim 12, wherein each of said cord accommodating grooves is substantially equal in outside diameter to the cord received therein.

14. The vehicular lamp of claim 12, wherein each of said cord accommodating grooves is slightly larger in outside diameter than the cord received therein.

15. The vehicular lamp of claim 1, wherein said each of said light bulb sockets comprises a socket casing in which a light bulb is inserted, and a pair of positive and negative terminals set inside said socket casing and partially exposed therein, said socket being fitted in a socket mounting recess formed in the inner surface of said rear cover.

16. The vehicular lamp of claim 15, wherein each of said positive and negative terminals comprises a plurality of bulb connecting end portions each in the form of an elastic plate, and a cord connecting end portion.

17. The vehicular lamp of claim 16, wherein said cord connecting end portion is in the form of a box protruding behind said socket casing.

18. The vehicular lamp of claim 17, wherein a V-shaped cord connecting groove is formed in one side wall of said cord connecting end portion and serving as an insulating-cover cutting edge.

19. A vehicular lamp comprising:

a lamp body;

a rear cover arranged in an opening formed in a rear wall of said lamp body;

a plurality of light bulb sockets, a plurality of light bulbs fitted in respective ones of said sockets, and a plurality of cords arranged on an inner surface of said rear cover and connected to respective ones of said light bulbs through said sockets; and a first connector mounting section comprising a plurality of terminals arranged in a connector region of said rear cover, each of said terminals having a cord connecting end portion with a cord connecting groove in which an end portion of a respective one of said cords is inserted, each of said cord connecting grooves having an edge for cutting an insulating cover of said cord and making electrical contact to a core wire of said cord, wherein said first connector mounting section comprises a first connector detachably fitted in a conforming hole in said rear cover, wherein said first connector comprises a connector casing made of resin formed by injection molding, said terminals being arranged in said connector casing, and wherein said connector casing is in the form of a rectangular box having a bottom wall, a pair of first side walls parallel to one another, and a second pair of side walls parallel to one another, a plurality of parallel grooves being formed in at least one of said side walls extending to an edge of said box-shaped connector casing, a pair of terminal mounting boards extending outward from respective two parallel edges of said bottom wall from which said first pair of side walls extend, and wherein connector casing further comprises a pair of engaging ears formed along middle parts of two parallel edges of said bottom wall from which said second pair of side walls extend, each said engaging ears being in the form of a prismatic triangle, having a first surface sloped with respect to a corresponding side wall, a pair of surfaces at ends of said sloped surface, and a rear surface flush with an outer surface of said bottom wall.

20. The vehicular lamp of claim 19, wherein said connector casing further comprises a plurality of protrusions extending along inner surfaces of said first pair of side walls from an inner surface of said bottom wall of the connector casing.

21. The vehicular lamp of claim 20, wherein a first set of said protrusions extend along an inner surface of one side wall of said first pair of side walls and are located on one side of second connecting end portions said terminals, while a second set of said protrusion extend along an inner surface of the other side wall of said first pair of side walls and are located on the other side of said second connecting end portions, front end faces of said protrusions being located deeper in said connector casing than ends of said second connecting end portions of said terminals, being flush with one another, and defining an insertion length of said second connector.

22. A vehicular lamp comprising:

a lamp body;

a rear cover arranged in an opening formed in a rear wall of said lamp body;

a plurality of light bulb sockets, a plurality of light bulbs fitted in respective ones of said sockets, and a plurality of cords arranged on an inner surface of said rear cover and connected to respective ones of said light bulbs through said sockets;

a first connector mounting section comprising a plurality of terminals arranged in a connector region of said rear cover, each of said terminals having a cord connecting end portion with a cord connecting groove in which an end portion of a respective one of said cords is inserted, each of said cord connecting grooves having an edge for cutting an insulating cover of said cord and making electrical contact to a core wire of said cord, said connector mounting section including a first connector detachably fitted in a conforming hole in said rear cover;

a pair of elastic engaging pieces formed on both sides of said connector mounting section in an inner surface of said first rear cover, each of said elastic engaging pieces being elastically deformable in the direction of its thickness, and a pair of engaging ears formed along middle parts of two parallel edges of said bottom wall from which said second pair of side walls extend, each said engaging ears being in the form of a prismatic triangle, having a first surface sloped with respect to a corresponding side wall, a pair of surfaces at end of said sloped surface, and a rear surface flush with an outer surface of said bottom wall, and wherein said elastic engaging pieces have locking pawls on inner surfaces of respective outer end portions engaged with respective engaging ears of said connector casing.

23. A vehicular lamp comprising:

a lamp body;

a rear cover arranged in an opening formed in a rear wall of said lamp body;

a plurality of light bulb sockets, a plurality of light bulbs fitted in respective ones of said sockets, and a plurality of cords arranged on an inner surface of said rear cover and connected to respective ones of said light bulbs through said sockets;

a first connector comprising a plurality of terminals arranged in a connector region of said rear cover, said first connector being disposed on an outer surface of said rear cover, each of said terminals having a cord connecting end portion with a cord connecting groove in which an end portion of a respective one of said cords is inserted, each of said cord connecting grooves having an edge for cutting an insulating cover of said cord and making electrical contact to a core wire of said cord;

an engaging wall surrounding at least portions of said first connector; and a connector cap for fitting end portions of said cords in respective ones of said cord connecting grooves, said connector cap being received in and fitted to said engaging wall;

wherein said plurality of cords connect said first connector to said sockets such that said plurality of light bulbs are electrically connected to said plurality of terminals, and said first connector is connected to a second connector to supply electricity to each of said light bulbs via said plurality of terminals; and wherein said second connector is disposed within a vehicle body, and said first connector is inserted into said vehicle body to connect to said second connector.

24. The vehicular lamp of claim 23, wherein each of said terminals comprises a vehicle-body-side connecting end portion in the form of an elongated plate, and a box-shaped cord connecting end portion.

25. The vehicular lamp of claim 24, wherein said second connecting end portion is inserted into a slit formed in the bottom of said terminal mounting section and protrudes outside said rear cover for making connection to a second connector.

26. The vehicular lamp of claim 25, wherein said box-shaped cord connecting end portion has a cord connecting groove formed in one side wall thereof which serves as said insulating-cover cutting edge.

27. The vehicular lamp of claim 26, wherein an elongated piece for preventing said terminal from coming off said terminal mounting section is formed in another side wall of said box-shaped cord connecting end portion, said elongated piece being engaged with a recess formed in a respective wall of said terminal mounting section.

28. The vehicular lamp of claim 27, wherein said terminals are directly fitted in said terminal mounting section.

29. A vehicular lamp comprising:

a lamp body;

a rear cover arranged in an opening formed in a rear wall of said lamp body;

a plurality of light bulb sockets, a plurality of light bulbs fitted in respective ones of said sockets, and a plurality of cords arranged on an inner surface of said rear cover and connected to respective ones of said light bulbs through said sockets;

a first connector comprising a plurality of terminals arranged in a connector region of said rear cover, said first connector being disposed on an outer surface of said rear cover, each of said terminals having a cord connecting end portion with a cord connecting groove in which an end portion of a respective one of said cords is inserted, each of said cord connecting grooves having an edge for cutting an insulating cover of said cord and making electrical contact to a core wire of said cord;

a connector casing fitted in a connector mounting through-hole formed in said rear cover; and a connector cap for fitting end portions of said cords in respective ones of said cord connecting grooves, said connector cap being detachably engaged with said connector casing so as to push said cords to fit said cords in said cord connecting grooves;

wherein said plurality of cords connect said first connector to said sockets such that said plurality of light bulbs are electrically connected to said plurality of terminals, and said first connector is connected to a second connector to supply electricity to each of said light bulbs via said plurality of terminals; and wherein said second connector is disposed within a vehicle body, and said first connector is inserted into said vehicle body to connect to said second connector.

* * * * *